(12) United States Patent
Tracey et al.

(10) Patent No.: US 11,420,748 B2
(45) Date of Patent: Aug. 23, 2022

(54) GALLEY CART EXTRACTION AND RETENTION SYSTEM FOR MULTIPLE-CART BAYS

(71) Applicant: B/E Aerospace, Inc., Winston-Salem, NC (US)

(72) Inventors: Christopher L. Tracey, Leighton Buzzard (GB); Daniel H Wall, Baldock (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 294 days.

(21) Appl. No.: 16/712,348

(22) Filed: Dec. 12, 2019

(65) Prior Publication Data

US 2021/0047042 A1     Feb. 18, 2021

Related U.S. Application Data

(60) Provisional application No. 62/888,229, filed on Aug. 16, 2019.

(51) Int. Cl.
*B64D 11/04* (2006.01)
*B64D 11/00* (2006.01)

(52) U.S. Cl.
CPC .......... *B64D 11/04* (2013.01); *B64D 11/0007* (2013.01)

(58) Field of Classification Search
CPC ..................... B64D 11/04; B64D 2011/0046
See application file for complete search history.

(56) References Cited

U.S. PATENT DOCUMENTS

| 9,821,911 B2 | 11/2017 | Wallbott et al. |
| 2019/0031348 A1 | 1/2019 | Bajorat et al. |
| 2019/0061950 A1 | 2/2019 | Hoogeveen et al. |

OTHER PUBLICATIONS

Extended Search Report for European Application No. 20157124.7 dated Sep. 25, 2020 9 pages.

*Primary Examiner* — Timothy D Collins
*Assistant Examiner* — Eric Acosta
(74) *Attorney, Agent, or Firm* — Suiter Swantz pc llo (57) ABSTRACT

A galley structure for an aircraft cabin includes double-depth cart bays capable of stowing an outer full-size cart in front of an inner fell-size cart. An extraction and retention (E&R) system is mounted to a sidewall of the double-depth cart bay and includes a stowable retainer arm and fixed extractor arm coupled to and articulable via an extraction handle that may be pulled or pushed out of or toward the cart bay. When the outer cart is removed, the inner cart can be brought forward for extraction via the extractor arm (the inner cart extractable once the retainer arm is stowed) and returned to its inner stowed position via the retainer arm (in both cases, by pulling or pushing the extraction handle). The extraction handle includes a retainer actuator for stowing or deploying the retainer arm as needed.

10 Claims, 13 Drawing Sheets

GALLEY CART EXTRACTION AND RETENTION SYSTEM FOR MULTIPLE-CART BAYS

RELATED APPLICATIONS

This application claims priority under 35 U.S.C. §§ 119 and/or 120 to the following U.S. Patent Applications: U.S. Provisional Patent Application Ser. No. 62/888,229 filed Aug. 16, 2019. Said U.S. patent application 62/888,229 is herein incorporated by reference in its entirety.

TECHNICAL HELD

The subject matter disclosed herein is directed generally to aircraft interiors and more particularly to galley structures or monuments incorporating cart bays within which galley carts are stowed.

BACKGROUND

On commercial passenger aircraft galleys, maximizing galley cart stowage is a key requirement, especially for long haul services. Galley carts are generally stowed within a galley structure or monument in bays adjacent to the galley floor (allowing the galley carts to be extracted from or returned to bays via dorsal wheels or casters, which also allow the carts to be transported along aircraft aisles for in-seat dining and beverage services). Galley cart bays may be expanded in depth in order to store multiple carts therewithin; however, tandem cart storage complicates the extraction and retention of an inner cart from/within a tandem cart bay once the outer cart is extracted from the bay.

SUMMARY

A galley structure installable in an aircraft cabin is disclosed. In embodiments, the galley structure includes one or more galley cart bays, each bay having a forward end accessible from the cabin, a rear wall opposite the forward end, and two sidewalls extending between the forward and the rear wall, a cart space between the sidewalls. Some galley cart bays are extended-depth bays wherein the cart space can accommodate an inner cart stowed within the cart bay (e.g., against the rear wall) and an outer cart in front of the outer cart (e.g., accessible from the forward end). The extended-depth cart bay includes an extraction and retention (E&R) in a housing mounted to either sidewall. The E&R system includes a retainer arm having a stowed (vertical) position and a deployed (horizontal) position, the deployed position extending into the cart space to secure the inner cart in a stowed position or return the inner cart thereto. The E&R system includes an extraction handle coupled to the retainer arm and including a retainer actuator for deploying the retainer arm (e.g., when bringing the inner cart forward for extraction, or returning the inner cart to the rearward stowed position within the cart bay). The E&R system includes an extractor arm coupled to the handle and in a fixed horizontal position behind the stowed inner cart. The extraction handle may be articulated inward or outward (parallel to the sidewall) to 1) extract the inner cart from its inner stowed position within the cart bay via the extractor arm and 2) return the inner cart to the inner stowed position via the retainer arm.

A galley structure installable in an aircraft cabin is also disclosed. In embodiments, the galley structure includes one or more galley cart bays, each bay having a forward end accessible from the cabin, a rear wall opposite the forward end, and two sidewalls extending between the forward and the rear wall, a cart space between the sidewalls. Some galley cart bays are extended-depth bays wherein the cart space can accommodate an inner cart stowed within the cart bay (e.g., against the rear wall) and an outer cart in front of the outer cart (e.g., accessible from the forward end). The extended-depth cart bay includes an extraction and retention (E&R) in a housing mounted to either sidewall. The E&R system includes a retainer arm having a stowed (vertical) position and a deployed (horizontal) position, the deployed position extending into the cart space to secure the inner cart in a stowed position or return the inner cart thereto. The E&R system includes an extraction handle coupled to the retainer arm and including a locking mechanism for securing the retainer arm into alignment with the extraction handle (e.g., when bringing the inner cart forward for extraction, or returning the inner cart to the rearward stowed position within the cart bay). The E&R system includes an extractor arm coupled to the extraction handle by an extractor rod and in a fixed horizontal position behind the stowed inner cart. The retainer arm is incorporated into a retainer sleeve rotatably or pivotably disposed around the extractor arm. The extraction handle may be pulled or pushed in or out of the cart bay (parallel to the sidewall) to extract the inner cart from its inner stowed position via the extractor arm, and to return the inner cart to the inner stowed position via the retainer arm. When locked into alignment with the extraction handle, the retainer arm may be deployed or stowed by rotation of the extraction handle.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

Broadly speaking, embodiments of the inventive concepts disclosed herein are directed to a means of restraining and/or puffing an inner standard-size galley cart forward in an extended-depth cart bay such that the integrated handle of the inner standard-size galley cart is within easy reach of the flight attendant, allowing the inner standard-size galley cart to be removed in the usual way, but also providing that the inner standard-size galley cart is secured in place within the cart bay until removed therefrom (or until an outer cart (e.g., an outer half-size galley cart) is returned thereto in an outer position adjacent to the forward end of the cart bay). Such a combined extraction and retention (E&R) system may be operated from the same location at or near the forward end of the extended-depth cart bay.

Figure 1:
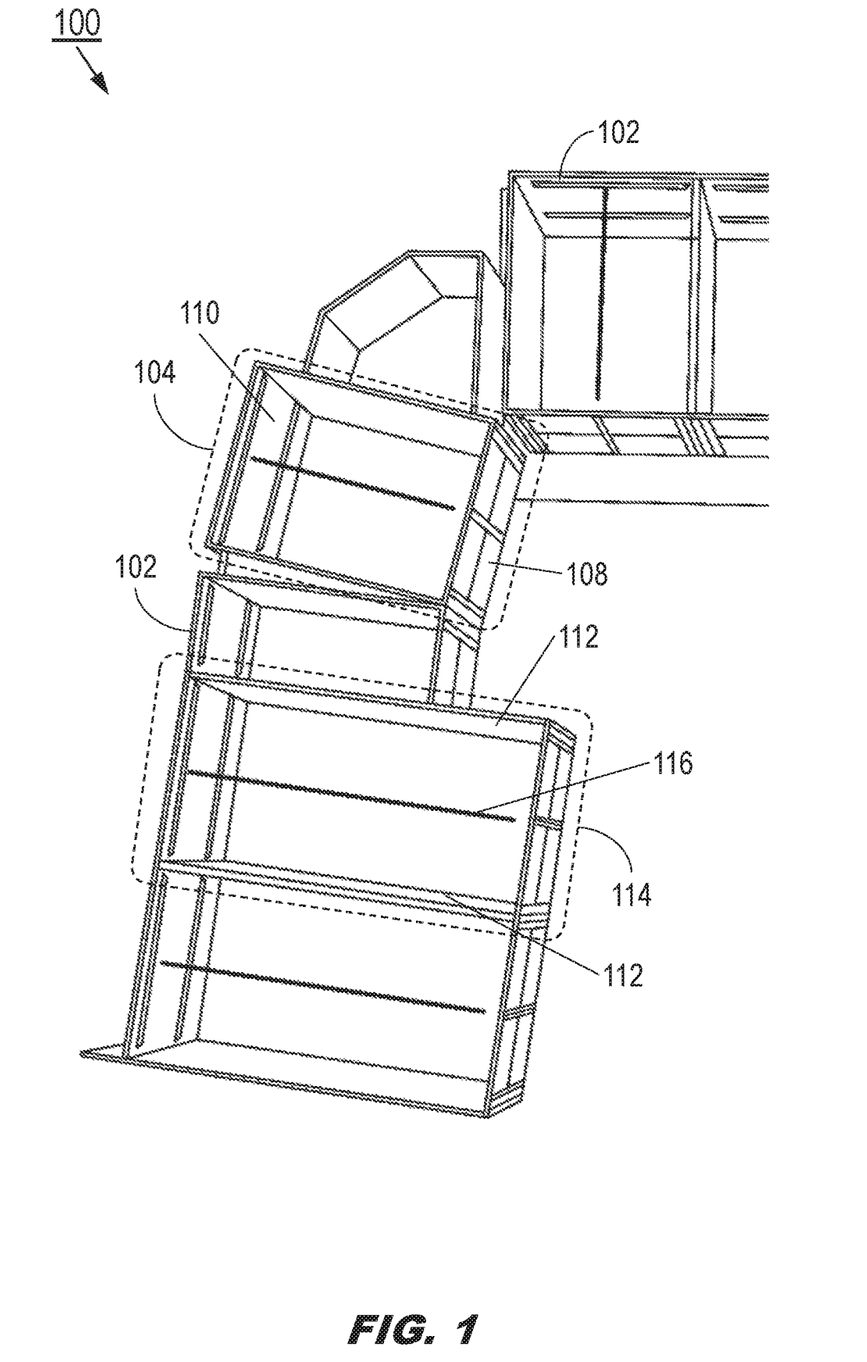
FIG. 1 is an overhead partial diagrammatic illustration of a galley architecture in accordance with example embodiments of this disclosure.

Referring generally to FIG. 1, an aft galley architecture 100 (e.g., galley complex, galley complex suite) may include one or more galley structures 102 (e.g., galley monuments) installed within an aircraft cabin (e.g., defining a galley area aft of a passenger cabin, or elsewhere within the cabin).

In embodiments, the galley structures 102 may include cart bays 104 configured for the stowage of galley carts 106 (e.g., trolleys). Each cart bay 104 may include a forward end 108 via which galley carts 106 may be extracted from, and returned to, the cart bay; a rear wall 110 opposite the cart bay, and sidewalls 112 extending between the forward end and the rear wall on either side of a cart space where the stowed galley cart rests within the cart bay. For example, galley carts 106 may be wheeled into a cart bay 104 (e.g., via the forward end 108) for stowage during taxi, takeoff and landing (TTL) flight segments. The galley carts 106 may be removed from their cart bays 104 for transport along main aisles of the passenger cabin for in-seat food and beverage services to passengers. In some embodiments, the cart bays 104 may be connected to cold-air ducts and air chiller devices capable of circulating chilled air throughout the cart bays to maintain the galley carts 106 at or below a desired temperature.

In embodiments, the galley structures 102 may take advantage of previously unused space within the galley environment 100 by incorporating extended-depth cart bays 114 capable of stowing multiple galley carts within. For example, cart bays 104 of standard size may be designed to removably secure a standard-size galley cart 106 (e.g., of standard width, height, and depth). Extended-depth cart bays 114 may allow for the storage of two galley carts 106, e.g., in a tandem configuration. These tandem carts may be any combination and order of standard-size (e.g., full-size) galley carts and half-size galley carts (a half-size cart being identically sized to a standard-size cart, except having a depth half that of a standard-size cart), where one cart is an inner cart (e.g., stored adjacent to the rear wall 110 of the extended-depth cart bay 114) and the other is an outer cart (e.g., stored in front of the inner cart, relative to the forward end 108 of the extended-depth cart bay 114. The galley carts 106 may be extracted from, and returned to, the extended-depth cart bay 114 via the forward end 108. However, the reclamation of unused space in this fashion may result in additional challenges associated with extraction, restraint/retention, and removal of stowed galley carts 106 within the extended-depth cart bay 114. In some embodiments, two adjacent standard-depth cart bays 104, or two adjacent extended-depth cart bays 114, may share common sidewalls 112 at least partially separated from each other by a divider 116.

Figure 2:
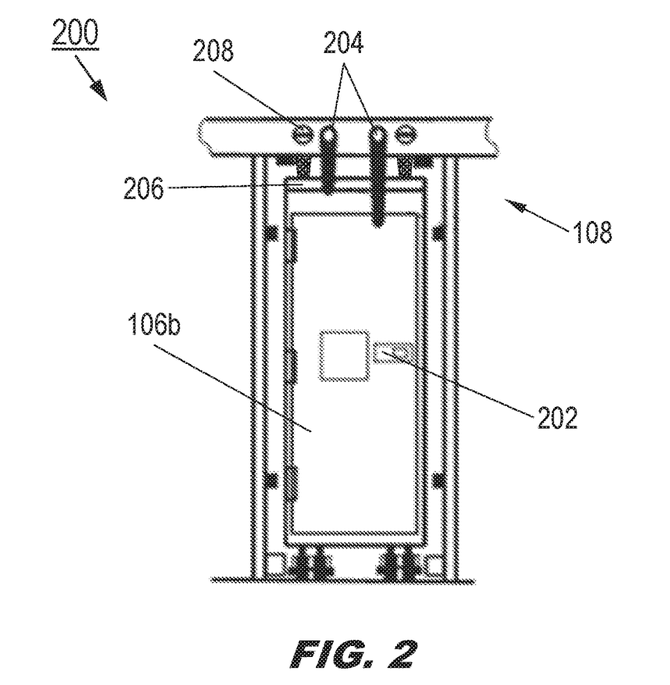
FIGS. 2 and 3 are respectively forward and left side views of a double-depth cart bay of the galley architecture of FIG. 1.
Figure 3:
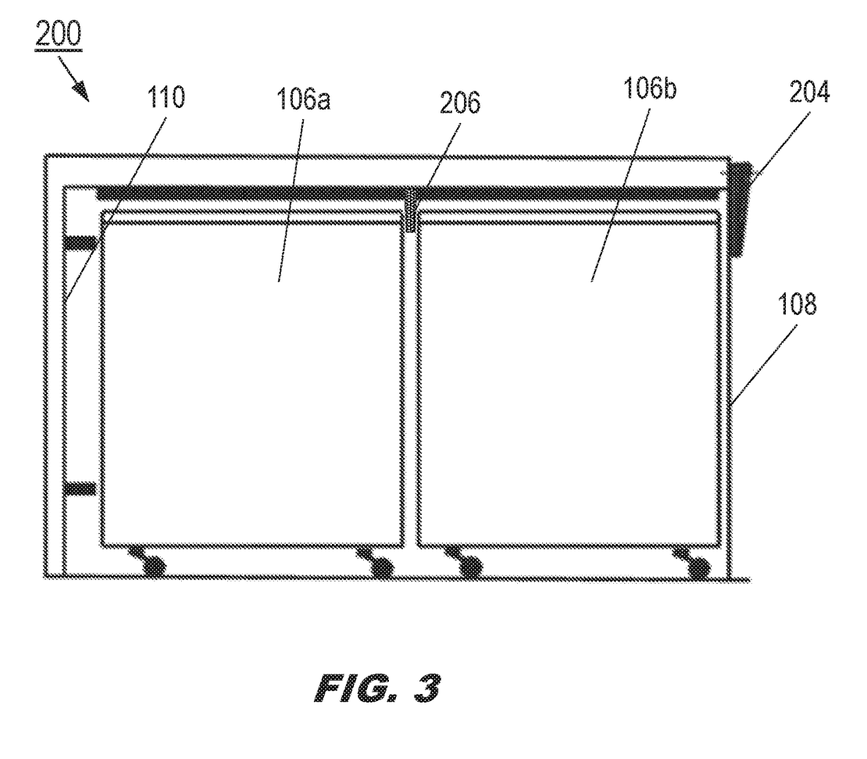

Referring to FIGS. 2 and 3, the double-depth cart bay 200 may be implemented and may function similarly to the extended-depth cart bay 114 of FIG. 1, except that the double-depth cart bay 200 may accommodate two standard-size galley carts 106 in a tandem configuration (e.g., an inner cart 106a adjacent to the rear wall 110, and an outer cart 106b adjacent to the forward end 108).

In embodiments, the depth of the double-depth cart bay 200 may complicate the extraction of the inner cart 106a once the outer cart 106b has been removed, due to the position of the cart handle 202 (at the forward end of the galley cart) and the probable weight of the contents (e.g., a fully loaded standard-size galley cart 106 may weigh in excess of 100 kg (220 lb)). The double-depth cart bay 200 may incorporate turn buttons 204 at the forward end 108 for retaining both inner and outer carts 106a-b within the cart bay. Intermediate retainers 206 may be incorporated to prevent (when the outer cart 106b is removed from the cart bay) the remaining inner cart 106a from roiling up and down the cart bay, toppling over or even exiting the cart bay completely, potentially damaging the galley architecture (100, FIG. 1) or component galley structures (102, FIG. 1). For example, the intermediate retainers 206 may be rotated into place via intermediate retainer knobs 208 disposed at the forward end 108, e.g., adjacent to the turn buttons 04. In an extreme case, an unrestrained or insufficiently restrained fully loaded 100 kg standard-size galley cart 106 may exit the double-depth cart bay 200 and pose an immediate risk of injury to any cabin crew or passengers in its path.

Figure 4A:
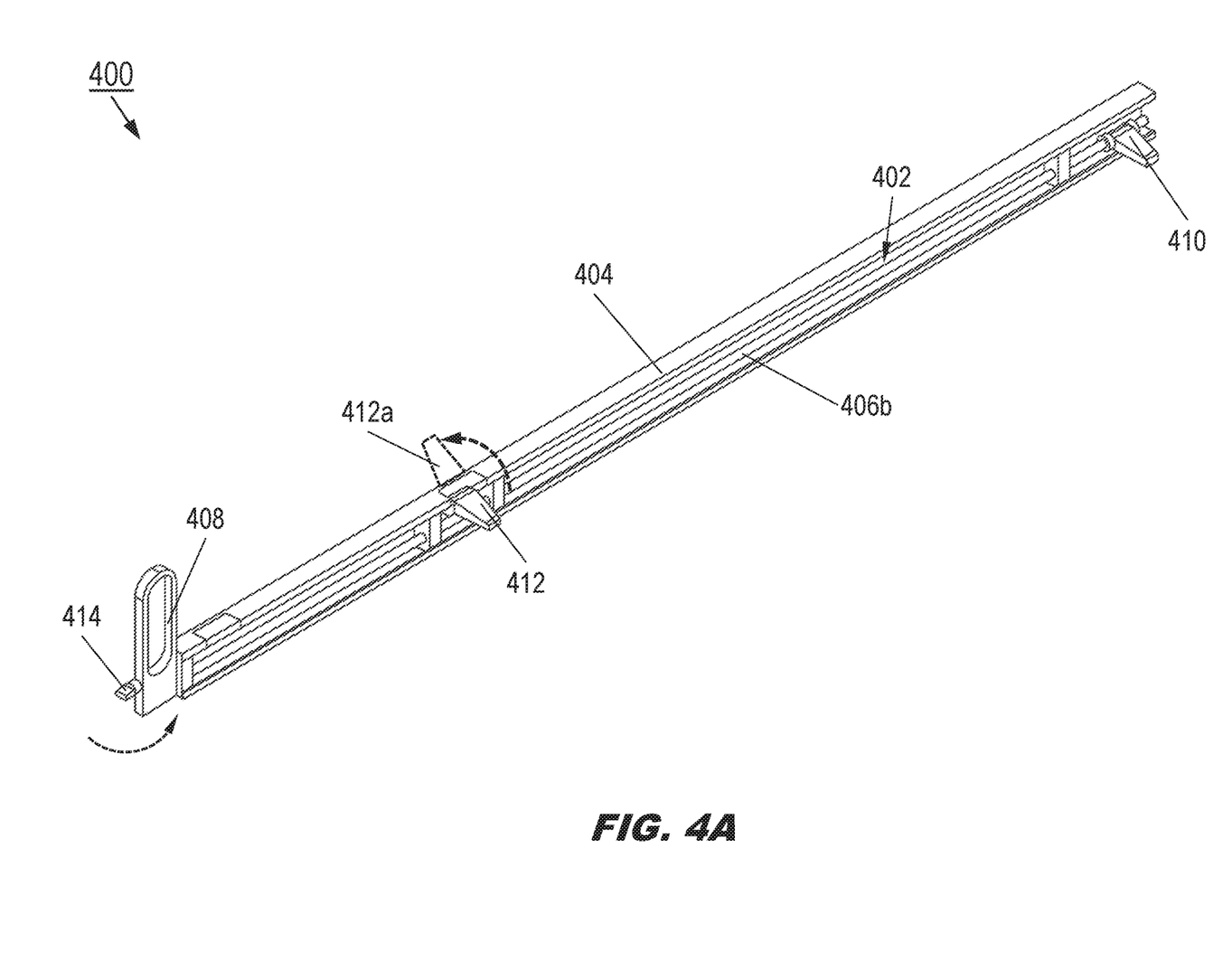
FIGS. 4A and 4B are isometric illustrations of an extraction and retention (E&R) system for the double depth cart bay of FIGS. 2 and 3.
Figure 4B:
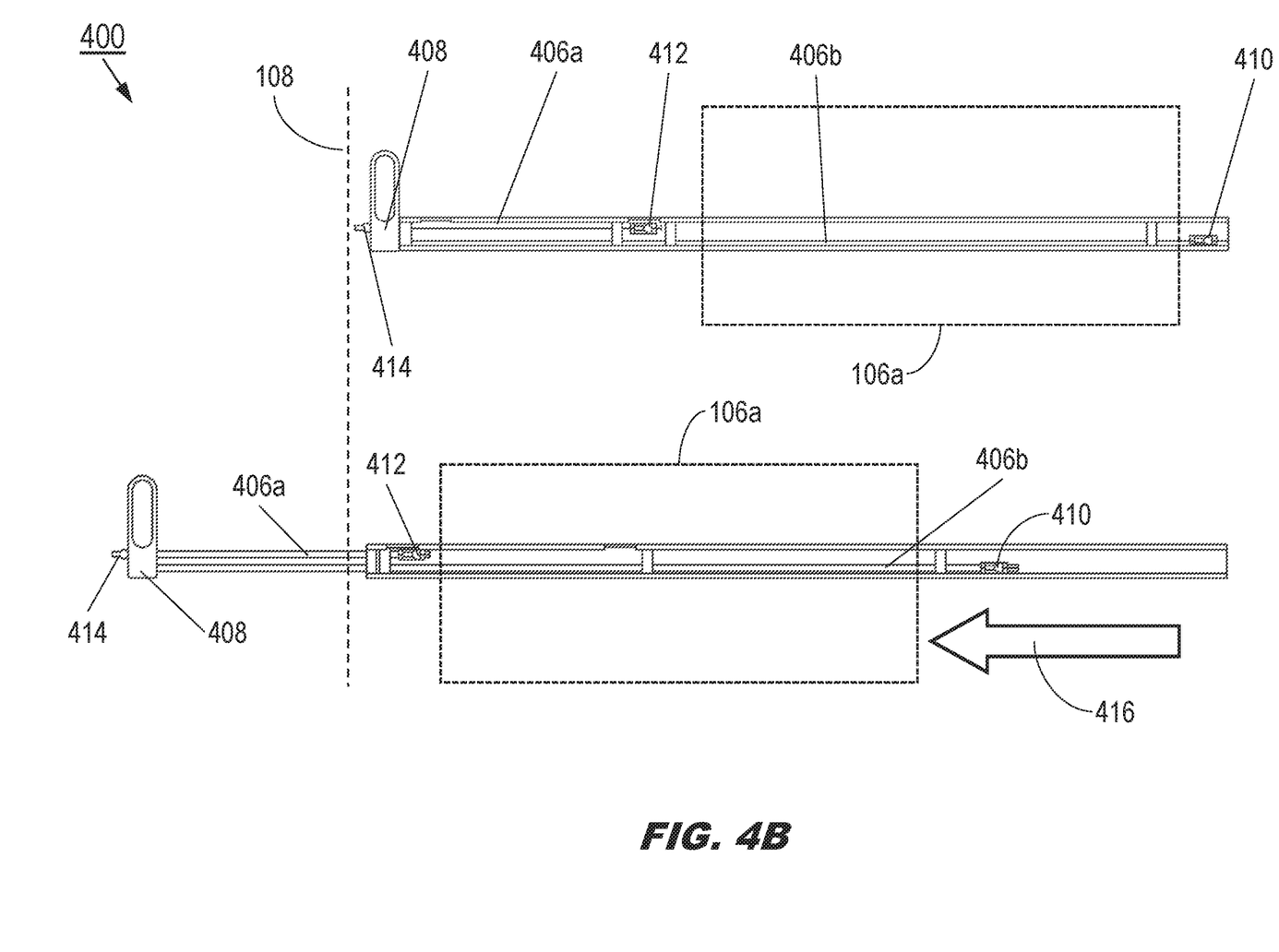

Referring in particular to FIG. 4A, the extraction and retention (E&R) system 400 may be mounted to either sidewall (112, FIG. 1) of the double-depth cart bay (200, FIGS. 2-3) and may include a slotted rail 402 or similar carrier set within an exterior housing 404, the housing comprising one or two separate rods (e.g., a retainer rod 406a and an extractor rod 406b) connected to an extraction handle 408 and extending along at least a portion of the slotted rail parallel to the sidewall.

In embodiments, the housing 404 may be mounted to either sidewall 112 (e.g., a sidewall not common to more than one double-depth cart bay 200, or opposite a divider (116, FIG. 1). The E&R system 400 may include an extractor arm 410 (e.g., inner cart extractor (ICE) arm) fixed to the extractor rod 406b) and a retainer arm 412 (e.g., intermediate retainer (IR) arm) pivotably mounted to the retainer rod 406a. For example, the extractor arm 410 may be deployed to extract the inner cart (106, FIG. 3) from an interior stowed position (e.g., adjacent to the rear wall (110, FIG. 1)) within the double-depth cart bay 200, while the retainer arm 412 may be independently deployed to retain the inner cart (106, FIG. 3) in the interior stowed position or in an outer stowed position adjacent to the forward end (108, FIG. 3) of the double-depth cart bay. In some embodiments, the retainer arm 412 may serve as a rearward retainer for the outer cart 106b (e.g., when the inner cart 106a is "in service" away from the double-depth cart bay 200).

In embodiments, the extraction handle 408 may be articulated by a user to deploy the retainer arm 412 or extract the inner standard-size galley cart 106 via the extraction arm 410. For example, the extraction handle 408 may incorporate a retainer actuator 414 configured to transition the retainer arm 412 between a stowed position 412a (e.g., substantially vertical and parallel to the sidewall 112). The retainer actuator 414 may include a rotary actuating knob (e.g., as shown by FIGS. 4A/B), a manual locking button, or a spring-loaded automatic lock (as shown below, e.g., by FIGS. 6-8). For example, when the inner cart 106a is in an interior stowed position within the double-depth cart bay 200, the retainer arm 412 may be transitioned to its stowed position (412a) via the retainer actuator 414 to draw the inner cart toward (416) the forward end 108 of the double-depth cart bay (e.g., via the extractor arm 410) and extract the inner cart from the cart bay. Similarly, when the inner cart 106a is returned to the forward end 108 of the double-depth cart bay 200, the retainer arm 412 may be transitioned into the deployed position (e.g., extending into the cart space and partially securing the inner cart in place between the retainer arm at its front and the extractor arm 410 at its rear) for returning the inner cart to its stowed interior position (e.g., as best shown by FIG. 4A).

Referring now to FIGS. 5A through 5D, the E&R system 400 mounted to a sidewall 112 of the double-depth cart bay 200 is shown.

Figure 5A:
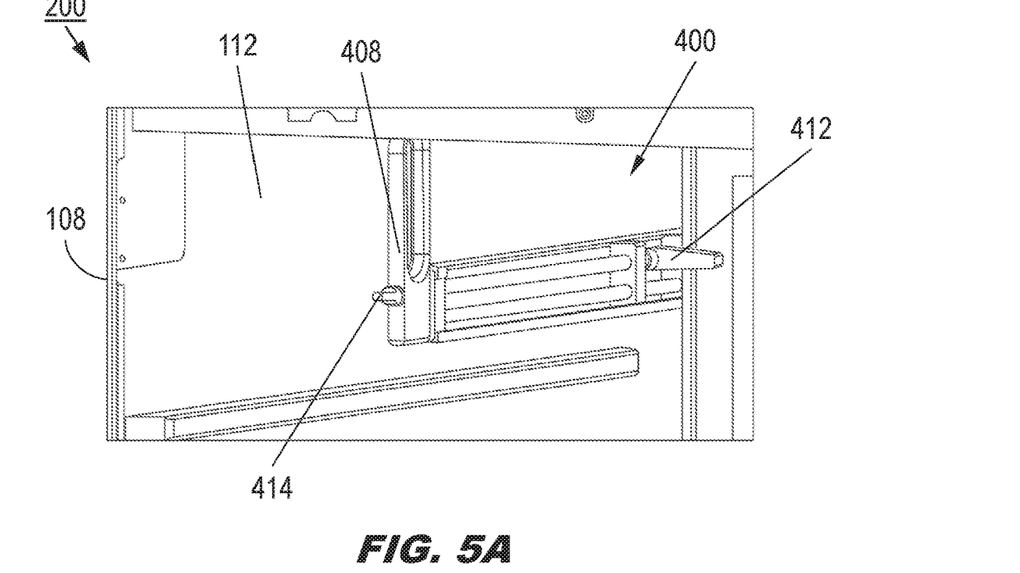
FIGS. 5A through 5D are illustrations of operations of the E&R system of FIG. 4A.

In embodiments, referring in particular to FIG. 5A, the outer cart (106b, FIG. 3) has been extracted from the double-depth cart bay 200 and the retainer arm 412 is in its deployed position, partially securing the inner cart (106a, FIG. 3) in its stowed interior position within the double-depth cart bay. The extraction handle 408 may be brought forward (416) toward the forward end 108 of the double-depth cart bay 200, bringing with it the inner cart 106a (e.g., between the deployed retainer arm 412 and the fixed extractor arm (410, FIGS. 4A/B)).

Figure 5B:
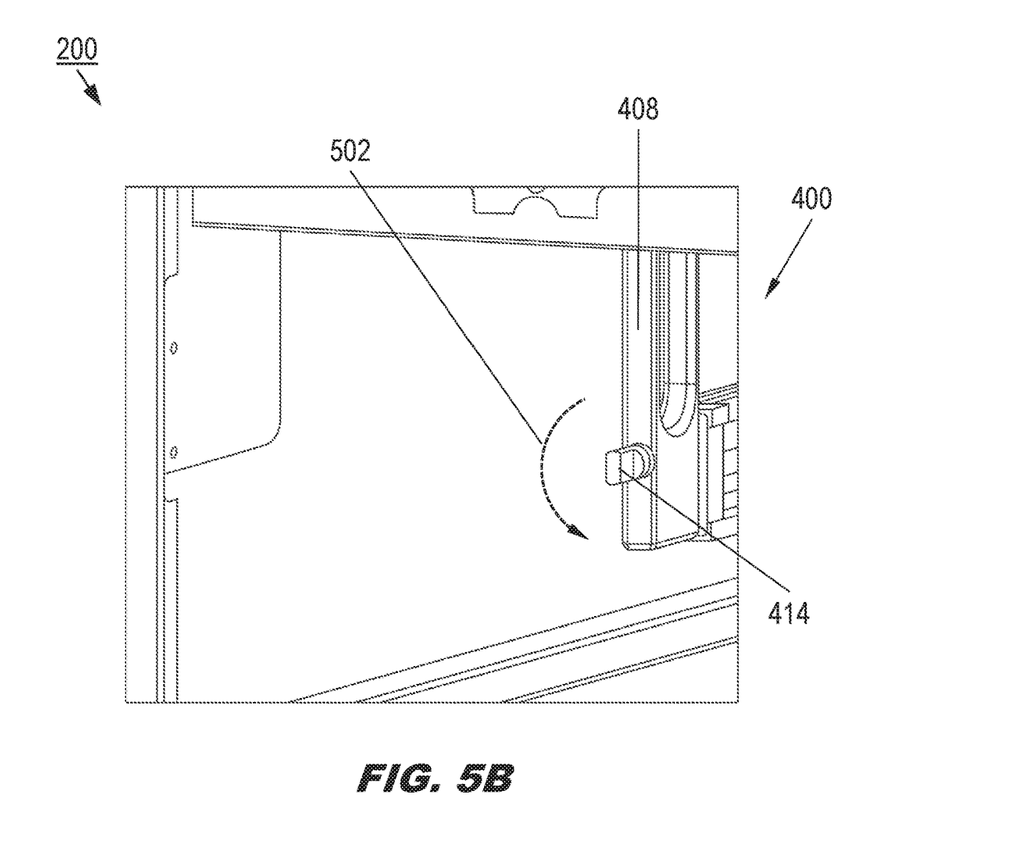
Figure 5C:
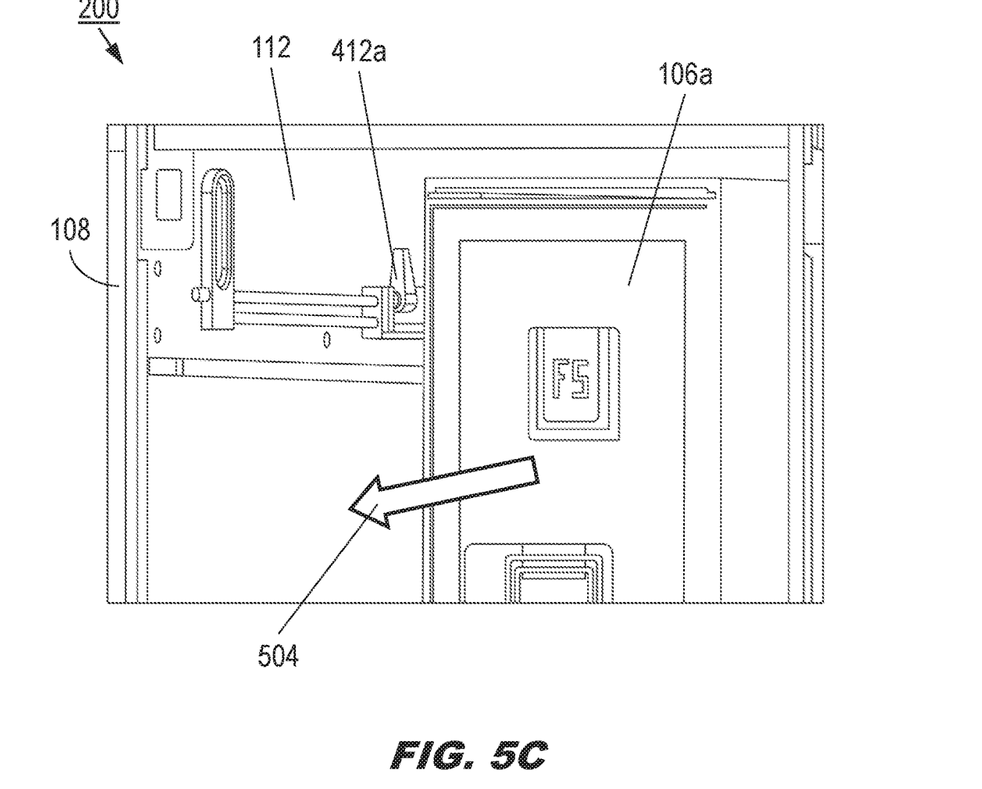
Figure 5D:
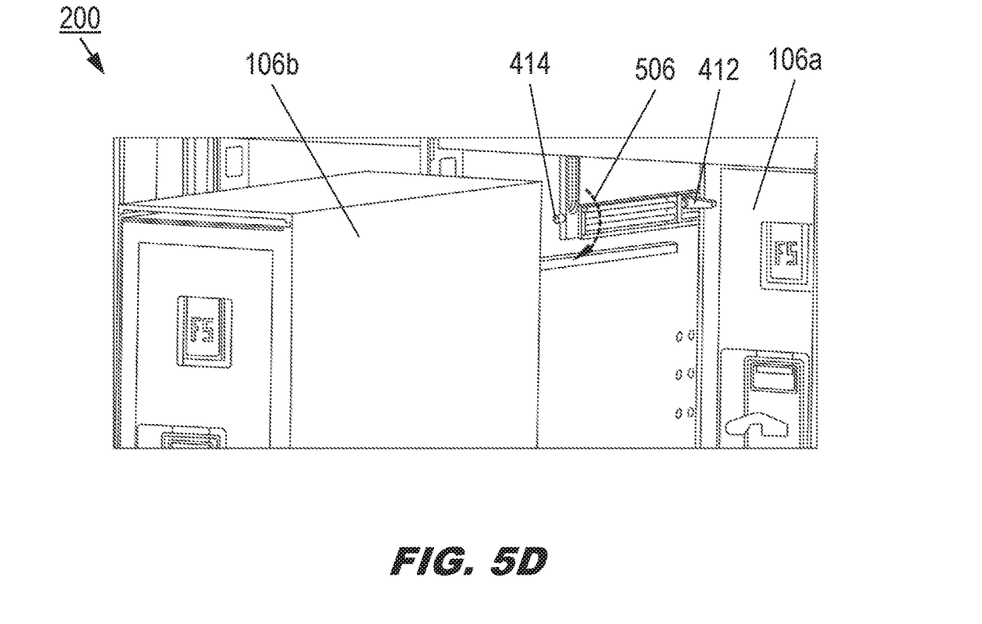
Figure 6:
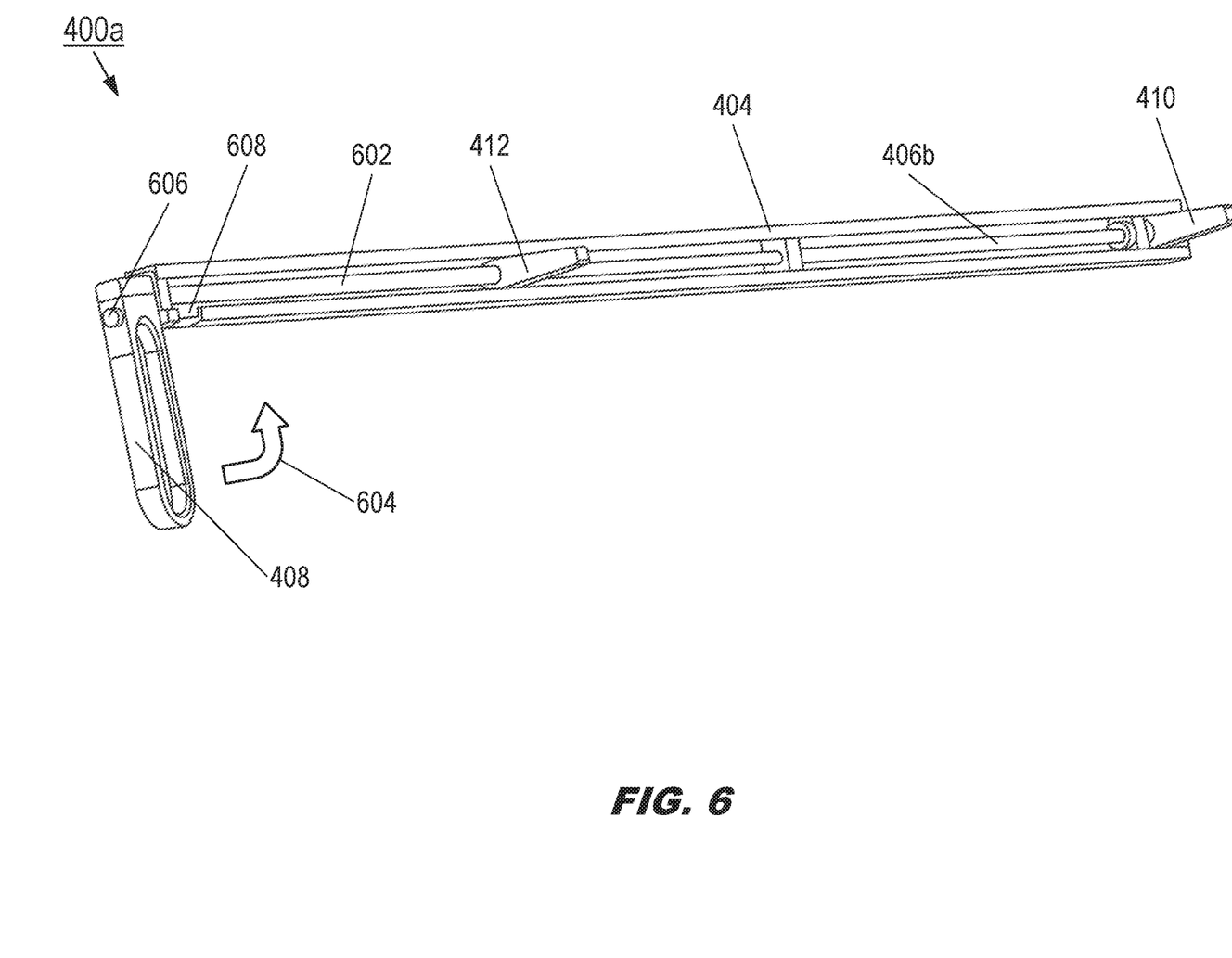
FIG. 6 is an illustration of an alternative E&R system for the double depth cart bay of FIGS. 2 and 3.

In embodiments, referring also to FIGS. 5B and 5C, the retainer actuator 414 may be rotated (502) to transition the retainer arm 412 to its stowed position (412a, FIG. 5C) substantially parallel to the sidewall 112, allowing the extraction (504) of the inner cart 106a. Referring also to FIG. 5D, the retainer actuator 414 may be counter-rotated (506; counter to the rotation 502, FIG. 5B) to redeploy the retainer arm 412 in front of the inner cart 106a, allowing the inner cart to be returned to its interior stowed position within the extended-depth cart bay 200 and the outer cart 106b restowed in front of the inner cart, In some embodiments, the twin retainer and extractor rods 406a-b (FIG. 4A) of the E&R system 400 (FIGS. 4A through 5D) may be unsupported over the section of travel required to pull the cart forward and thus prone to distortion under abuse loads. Referring to FIG. 6, the E&R system 400a may be implemented and may function similarly to the E&R system 400, except that the E&R system 400a may replace the retainer rod (406a, FIG. 4A) with a retainer sleeve 602 partially and pivotably covering the extractor rod 406b and incorporating the retainer arm 412.

In embodiments, both the retainer arm 412 and the extractor arm 410 may be articulable by the extraction handle 408 via the extractor rod 406b. For example, the extraction handle may be rotated (604) into alignment with the deployed retainer arm 412 to bring forward (416, FIG. 4B) the inner cart (106a, FIG. 5D) to the forward end (108, FIG. 4B) of the double-depth cart bay (200, FIGS. 5A-D). The extraction handle 408 may include a manual lock button 606 articulable by a user to lock the retainer arm 412 into alignment with the extraction handle, such that when the inner cart 106a is brought forward (416) for extraction, the extraction handle may be rotated back to a stowed position (e.g., substantially vertical and parallel to the sidewall 112, as shown by FIG. 5C) to also return the retainer arm 412 to its stowed position (412a, FIG. 5C). In some embodiments, the housing 404 of the E&R system 400a may incorporate one or more forward recesses 608 capable of accommodating the stowed retainer arm 412 either above or below the housing (and proximate to the forward end (108, FIGS. 4A/B)).

Referring to FIGS. 7A through 7D, the E&R system 400b may be implemented and may function similarly to the E&R system 400a of FIG. 6, except that the E&R system 400b may incorporate a housing 404 extending to the forward end 108 of the double-depth cart bay 200 and an extraction handle 408 having a default position within the extended-depth cart bay, e.g., between the forward end 108 and the rear wall (112, FIG. 1).

In embodiments, the extraction handle 408 may be accessible to a user if, and only if, the outer cart (106b, FIG. 3) has been extracted from the double-depth cart bay 200. For example, the extraction handle 408 may be rotated (604, FIG. 6) out into alignment with the deployed retainer arm (412, FIG. 6) to bring forward (416) the inner cart (106a, FIG. 5C) for extraction (504, FIG. 5C), after which the extraction handle and retainer arm may be locked into alignment via the manual lock button (606, FIG. 6) and rotated back into theft stowed positions. The E&R system 400b may incorporate, in addition to the forward recess 608 proximate to the forward end 108 of the double-depth cart bay 200 and capable of accommodating the stowed retainer arm (412a, FIG. 7D) (or, e.g., the extraction handle 408), a midpoint recess 702 capable of accommodating the extraction handle 408 in its stowed/folded position, or the stowed retainer arm 412a.

Figure 7A:
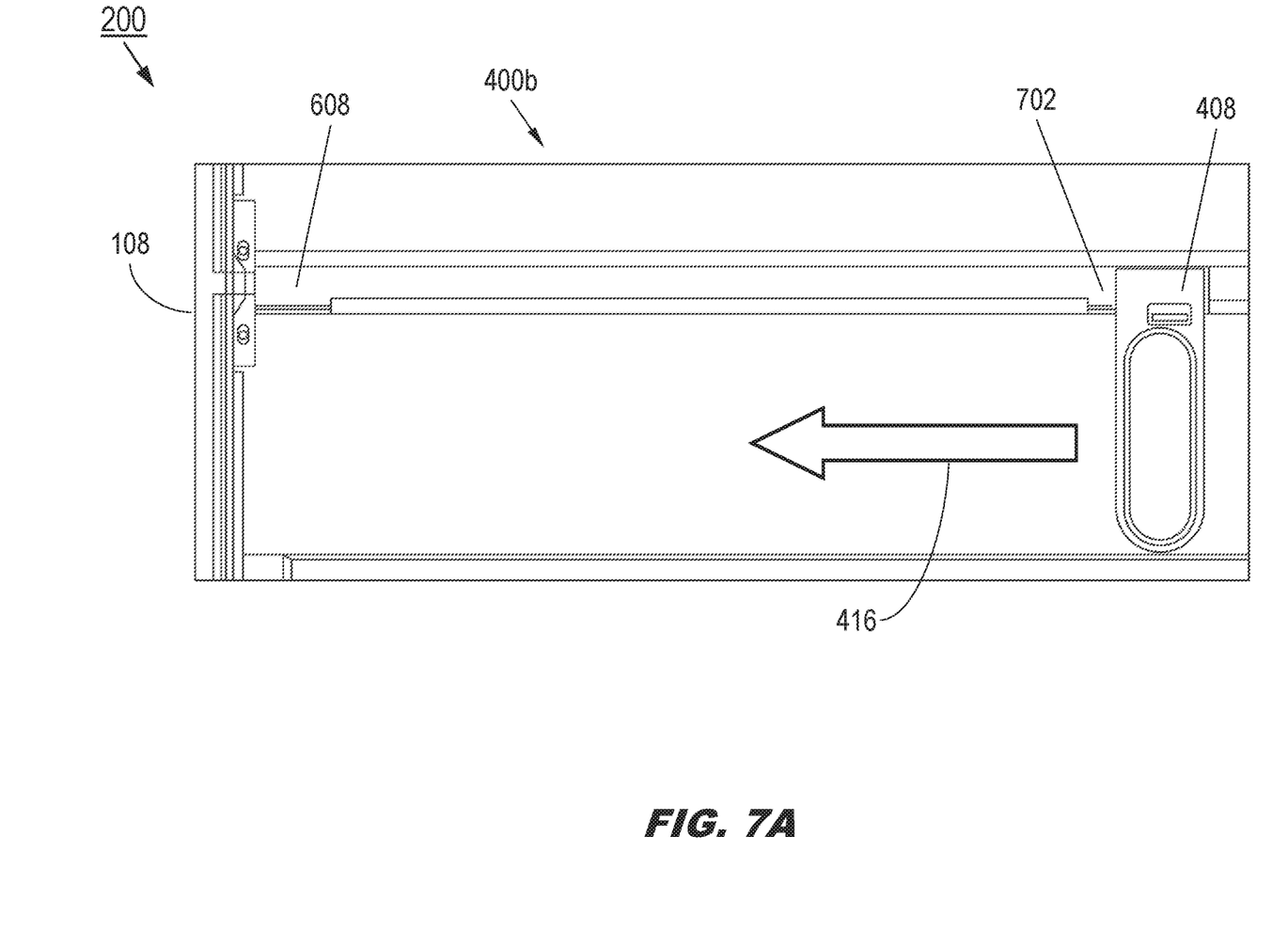
FIGS. 7A through 7D illustrate components of the E&R system of FIG. 6.
Figure 7B:
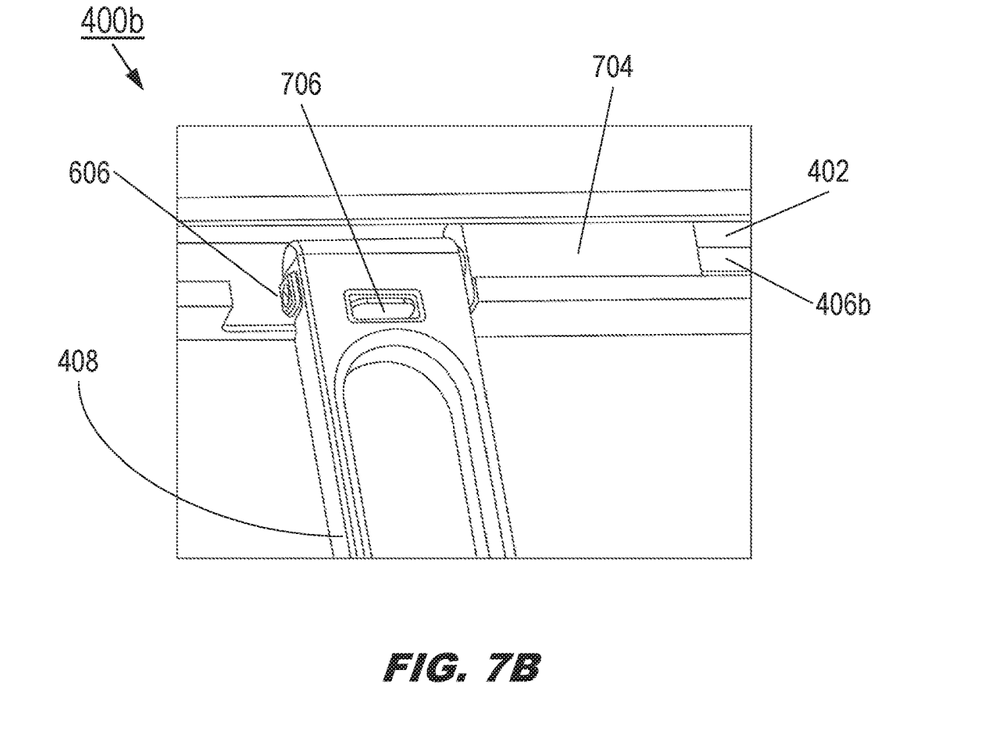
Figure 7C:
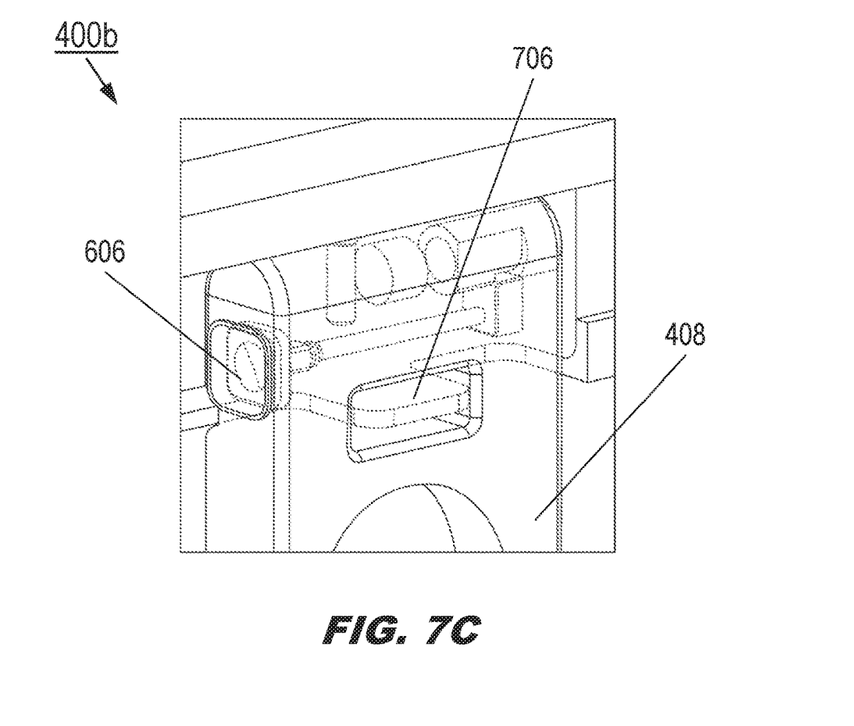

In embodiments, referring in particular to FIG. 7B, the E&R system 400b may include a sliding block 704 set within the slotted rail 402 to prevent torsion or twisting of the extractor rod 406b due to misalignment. Referring also to FIG. 7C, the E&R system 400b may include a retaining tab 706 allowing the extraction handle 408 to be folded into its stowed position, but preventing deployment of the retainer arm 412 via the manual lock button 606 unless the retainer arm 412 is in the correct position. For example, when returning the inner cart 106a to the double-depth cart bay 200, the extraction handle 408 may be rotated 90 degrees (with the manual lock button 606 engaged) to deploy the retainer arm 412 (in alignment with the extraction handle 408). The inner cart 106a may then be pushed back into its stowed interior position (see, e.g., FIG. 5D) via the extraction handle 408 and the retainer arm 412. The manual lock button 606 may be disengaged so that the extraction handle 408 may be folded into a stowed position while the retainer arm 412 remains deployed.

Figure 7D:
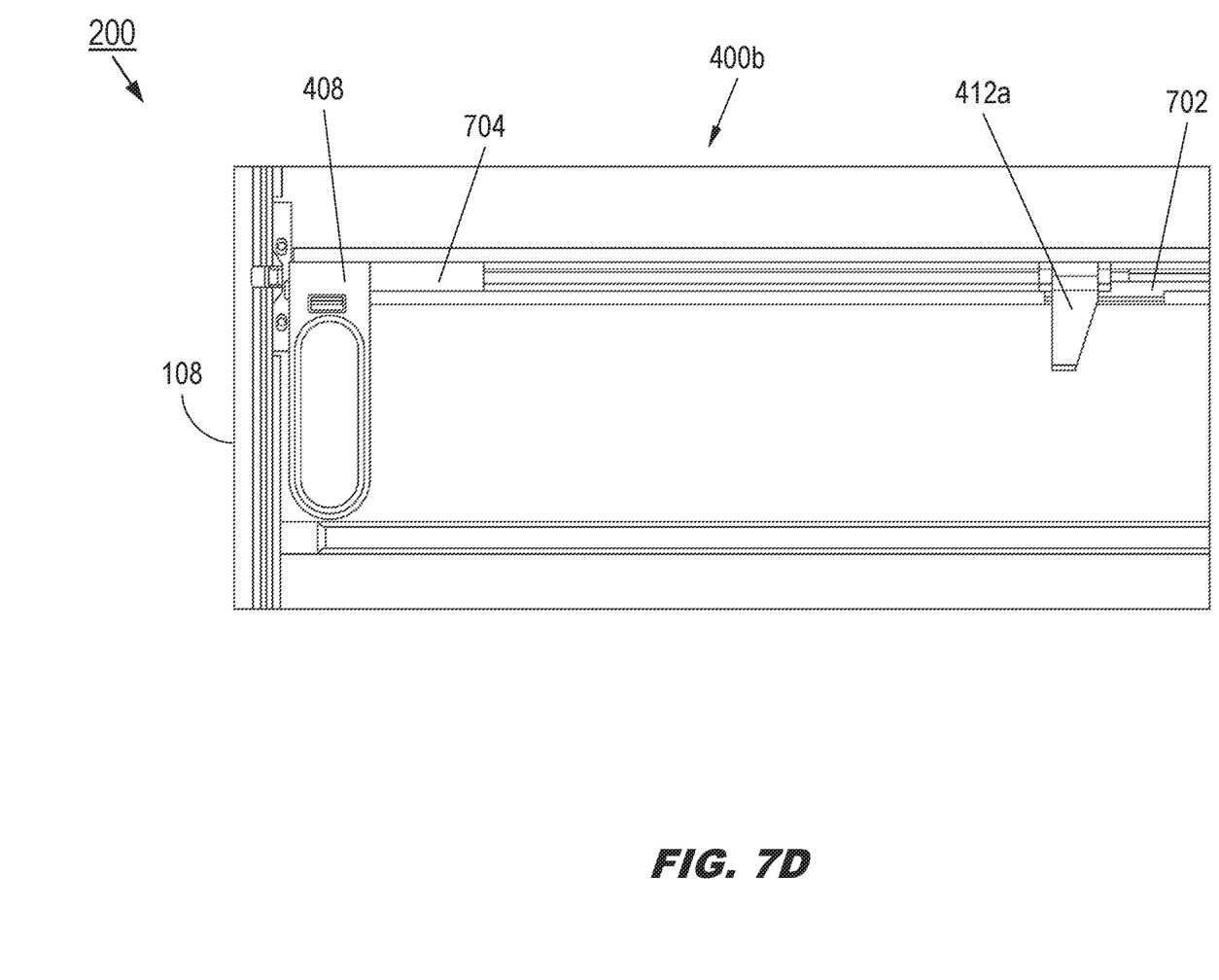
Figure 8:
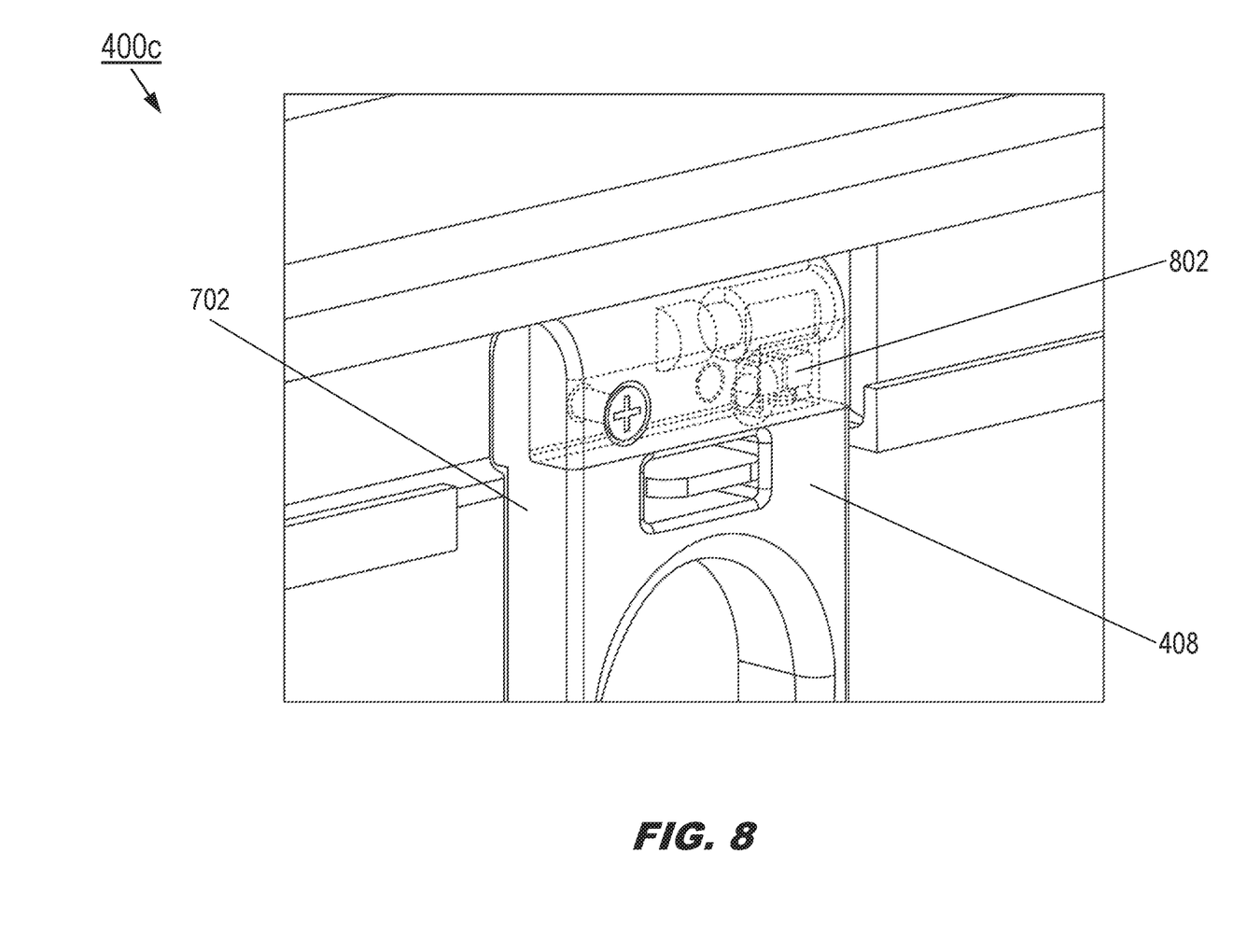
FIG. 8 illustrates an alternative locking mechanism of the E&R system of FIG. 6.

Referring to FIG. 8, the E&R system 400c may be implemented and may function similarly to the E&R system 400b of FIGS. 7A through 7C, except that the E&R system 400c may replace the manual lock button 606 (FIGS. 7B-C) with automatic spring-loaded locks 802 engaged by the rotation of the extraction handle 408 into the midpoint recess 702 corresponding to the midpoint default position of the extraction handle 408 (see, e.g., FIGS. 7A and 7D). In embodiments, the stowed retainer arm (412a, FIG. 7D) may be deployed by the outward rotation of the extraction handle 408.

Figure 9:
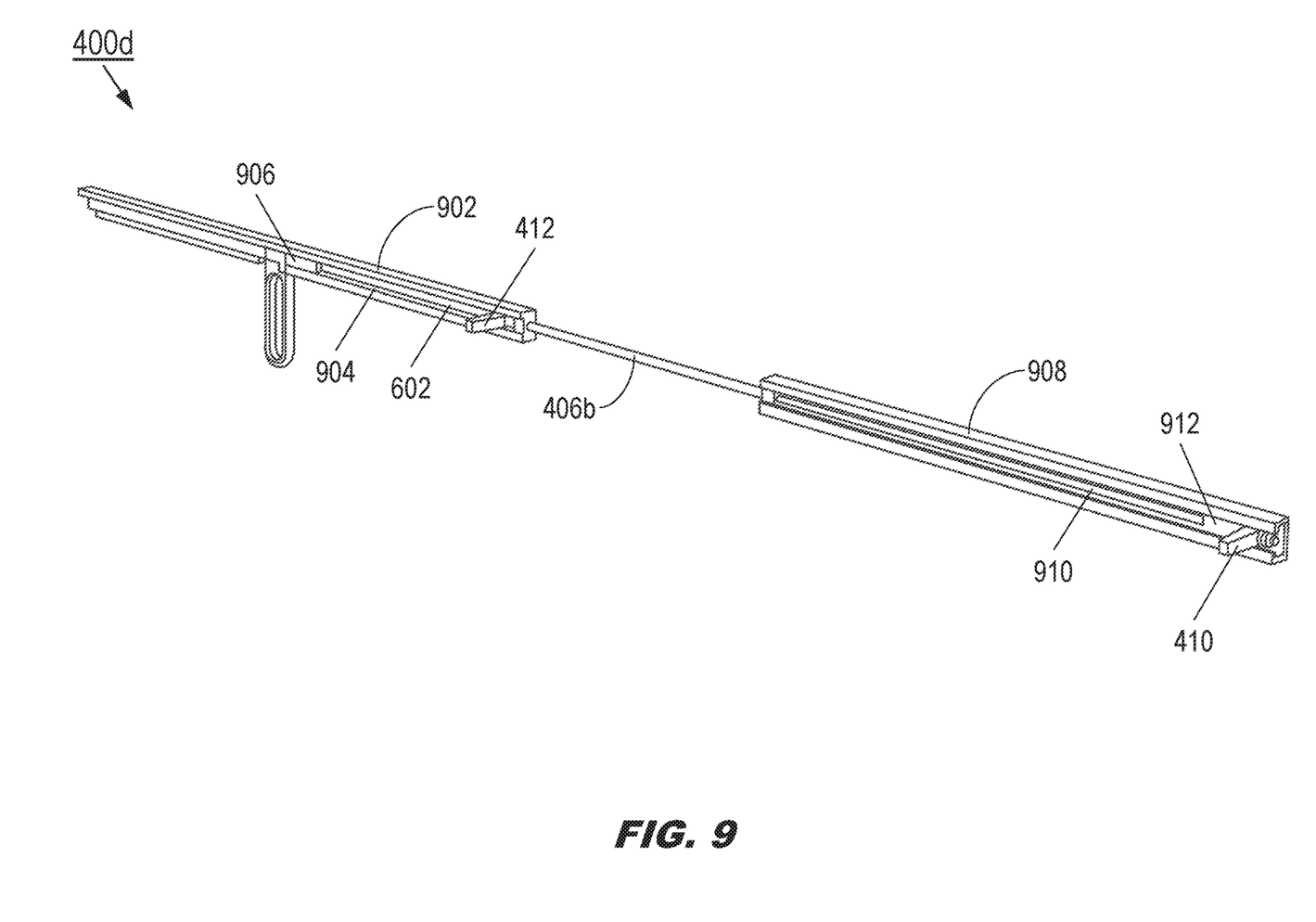
FIG. 9 illustrates an alternative E&R system for the double depth cart bay of FIGS. 2 and 3.

Referring now to FIG. 9, the E&R system 400d may be implemented and may function similarly to the E&R systems 400a-c of FIGS. 6 through 8, except that the E&R system 400d may incorporate a forward housing 902 having a forward track 904 and a forward sliding block 906 and a rear housing 908 having a rear track 910 and a rear sliding block 912.

In embodiments, the forward housing 902 may be disposed proximate to the forward end (108, FIG. 7A) of the double-depth cart bay (200, FIG. 3), while the rear housing 908 may be disposed proximate to the rear wall (110, FIG. 1). While the retainer sleeve 602 may remain pivotably disposed around the extractor rod 406b, the extraction handle 408 and retainer arm 412 may transit along the forward track 904, while the extractor arm 410 transits along the rear track 910.

Figure 10A:
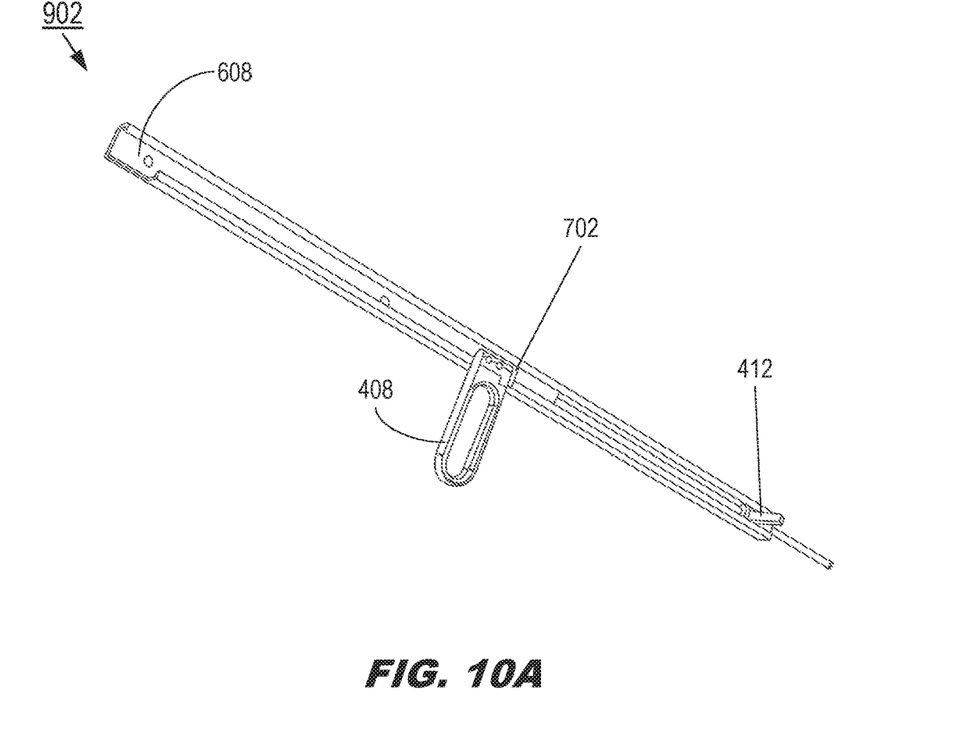
FIGS. 10A and 10B illustrate components of the E&R system of FIG. 9.
Figure 10B:
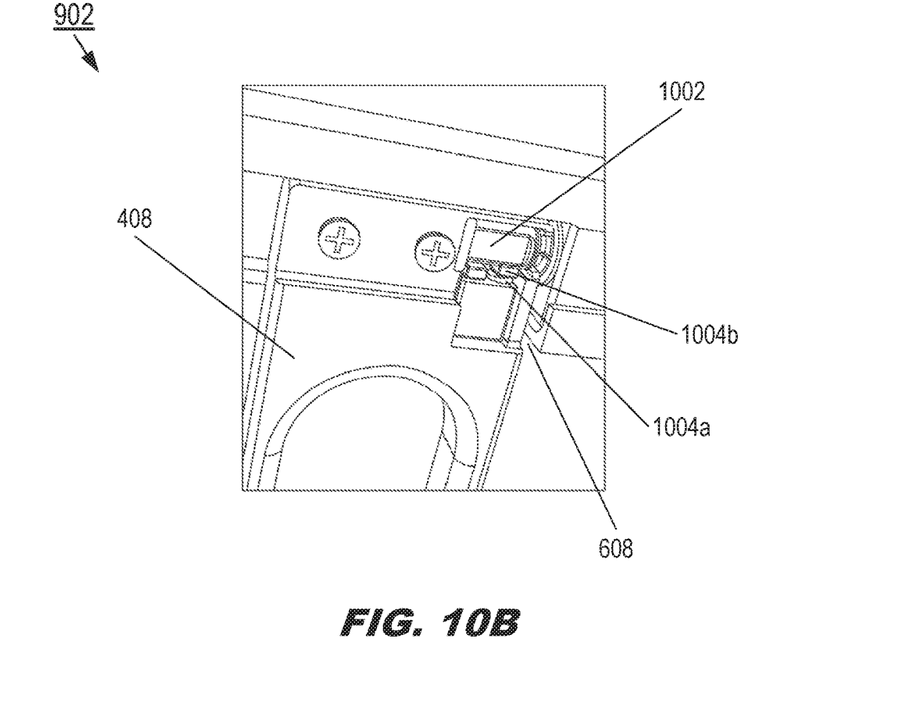

Referring to FIGS. 10A and 10B, the forward housing 902 is shown. In embodiments, the forward housing 902 may incorporate the forward recess 608 for accommodating the extraction handle 408 in its forward stowed/folded position, as well as the midpoint recess 702 capable of accommodating the extraction handle in its default stowed position (or the retainer arm 412 in its stowed position (412A, FIG. 7D)).

Referring in particular to FIG. 10B, the forward housing 902 may incorporate a cam section 1002 of the retainer sleeve (602, FIG. 9). In embodiments, the extraction handle 408 may incorporate internal springs 1004a and latching blocks 1004b. For example, the cam section 1002 may engage with the internal springs and latching blocks 1104a-b when the extraction handle 408 is rotated downward into the forward recess 608, automatically stowing the retainer arm 412 into a stowed position (412, FIG. 7D) within the midpoint recess 702.

We claim:

1. A galley structure installable in an aircraft cabin, comprising:
    one or more galley cart bays, each galley cart bay comprising:
        a forward end accessible via the aircraft cabin;
        a rear wall opposite the forward end;
        two sidewalls extending between the forward end and the rear wall on either side of a cart space, the cart space capable of accommodating:
            an outer cart associated with an outer stowed position proximate to the forward end;
            and
            an inner cart associated with an inner stowed position between the outer cart and the rear wall;
        and
        an extraction and retention (E&R) system mounted to a first sidewall of the two sidewalls, the E&R system comprising:
            at least one housing mounted to the first sidewall;
            a retainer arm and having a stowed position and a deployed position extending into the cart space, the retainer arm capable of securing the inner cart in the inner stowed position when in the deployed position;
            an extraction handle operatively coupled to the retainer arm and extending vertically from the housing along the first sidewall, the extraction handle including a locking mechanism configured to secure the retainer arm relative to the extraction handle;
            and
            an extractor arm operatively coupled to the extraction handle by an actuator rod and disposed between the inner cart and the rear wall;
            a retainer sleeve pivotably attached to the actuator rod, the retainer arm fixed to the retainer sleeve;
            the extraction handle articulable by a user parallel to the first sidewall to:
                extract the inner cart from the galley cart bay via the extractor arm;
                and
                return the inner cart to the inner stowed position via the retainer arm;
            and
            the extraction handle rotatable by the user to transition the locked retainer arm between the deployed position and the stowed position.

2. The galley structure of claim 1, wherein the locking mechanism includes a lock button manually articulable by the user.

3. The galley structure of claim 1, wherein the locking mechanism is configured to secure the retainer arm orthogonal to the extraction handle.

4. The galley structure of claim 1, wherein the locking mechanism is engaged by a rotation of the extraction handle.

5. The galley structure of claim 1, wherein:
    the extractor handle and actuator rod are articulable along at least one rail disposed within the housing.

6. The galley structure of claim 5, wherein the rail includes at least one of:
    a first recess configured to accommodate the retainer arm in the stowed position;
    and
    a second recess configured to accommodate the extraction handle.

7. The galley structure of claim 5, further comprising:
    at least one sliding block disposed within the rail proximate to the extraction handle, the sliding block configured to prevent torsion of the actuator rod.

8. The galley structure of claim 1, wherein:
    the extraction handle is articulable by the user parallel to the first sidewall between: a first position between the forward end and the rear wall;
    and
    a second position proximate to the forward end.

9. The galley structure of claim 1, wherein:
    the at least one housing includes at least a forward housing proximate to the forward end and a rear housing proximate to the rear wall,
    the extraction handle and the retainer arm configured to transit along a forward rail set into the forward housing,
    the extractor arm configured to transit along a rear rail set into the rear housing.

10. The galley structure of claim 9, wherein the forward housing includes at least one of:
    a recess configured to accommodate one or more of the extraction handle and the retainer arm;
    and
    at least one latching mechanism configured to secure the extraction handle within the recess.

* * * * *